United States Patent
Wang

(10) Patent No.: US 8,262,010 B2
(45) Date of Patent: Sep. 11, 2012

(54) COIL RACK FIXING DEVICE

(75) Inventor: Yu-Bin Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 260 days.

(21) Appl. No.: 12/862,723

(22) Filed: Aug. 24, 2010

(65) Prior Publication Data

US 2011/0163196 A1 Jul. 7, 2011

(30) Foreign Application Priority Data

Jan. 6, 2010 (TW) .............................. 99100125 A

(51) Int. Cl.
*B65H 81/06* (2006.01)
(52) U.S. Cl. ..................... 242/437.3; 242/431; 242/448
(58) Field of Classification Search ............... 242/431, 242/437, 437.3, 448
See application file for complete search history.

(56) References Cited

U.S. PATENT DOCUMENTS

| 1,833,221 | A | * | 11/1931 | Leidy | 29/605 |
| 4,097,987 | A | * | 7/1978 | Miller | 29/605 |
| 4,538,771 | A | * | 9/1985 | Tardy | 242/431 |
| 4,833,774 | A | * | 5/1989 | Jacob-Grinschgl et al. | 29/605 |
| 6,644,584 | B2 | * | 11/2003 | Mori et al. | 242/437.3 |
| 7,082,674 | B2 | * | 8/2006 | Mori et al. | 29/605 |

* cited by examiner

*Primary Examiner* — Emmanuel M Marcelo
(74) *Attorney, Agent, or Firm* — Altis Law Group, Inc.

(57) ABSTRACT

A coil rack fixing device for fixing a coil rack to a rotor of a winding machine, includes a first member and a second member. The first member is configured for mounting on the rotor. The first member includes a support shaft coaxial to the rotor. The support shaft has a magnetic attracting portion positioned on a free end thereof. The second member includes a body and a magnet. The body defines a through hole thereof. The through hole receives the support shaft. The magnet is received in the through hole and capable of moving along the through hole relative to the magnetic attracting portion.

9 Claims, 4 Drawing Sheets

COIL RACK FIXING DEVICE

BACKGROUND

1. Technical Field

The present disclosure relates to fixing devices, and particularly, to a coil rack fixing device for fixing coil racks to a rotor of a winding machine.

2. Description of Related Art

Electromagnetic devices such as voice coil motors often comprise a coil. The coil usually includes a coil rack and a winding wound around the coil rack. During the manufacturing process of the coil, the coil rack is fixed to a rotor of a winding machine by a fixing device. A typical fixing device includes a first part and a second part. The first part is fixed to the rotor. The second part is attached to the first part with the coil rack intervened therebetween by magnetic force, thereby securing the coil rack between the first part and the second part. The magnetic force is usually unadjustable. However, different types of coil racks can withstand different levels of magnetic force. Therefore, more than one fixing device of different suitable magnetic force is required to wind different types of coil racks, thereby increasing cost and inconvenience.

Therefore, it is desirable to provide a new coil rack fixing device which can overcome the above-mentioned limitations.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail with reference to the drawings.

Figure 1:
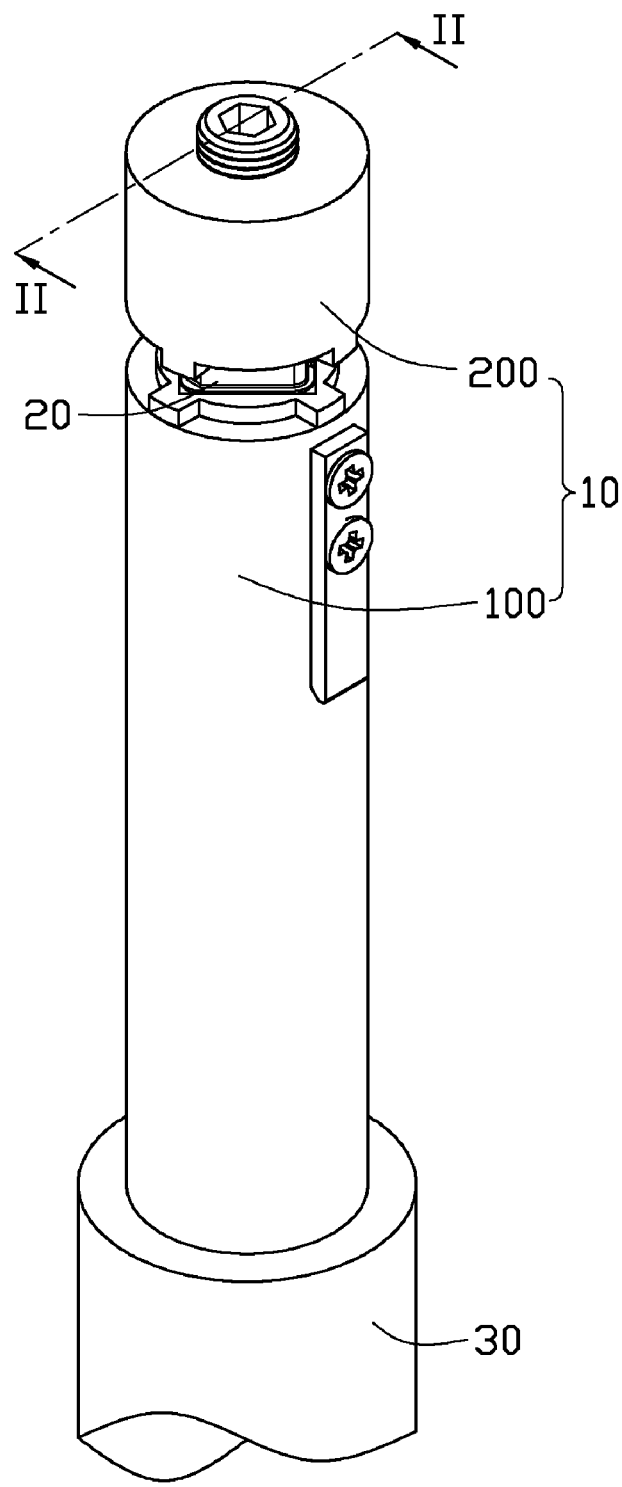
FIG. 1 is an isometric, assembled view showing a coil rack that is fixed to a rotor of a winding machine by a coil rack fixing device, according to an exemplary embodiment.
Figure 2:
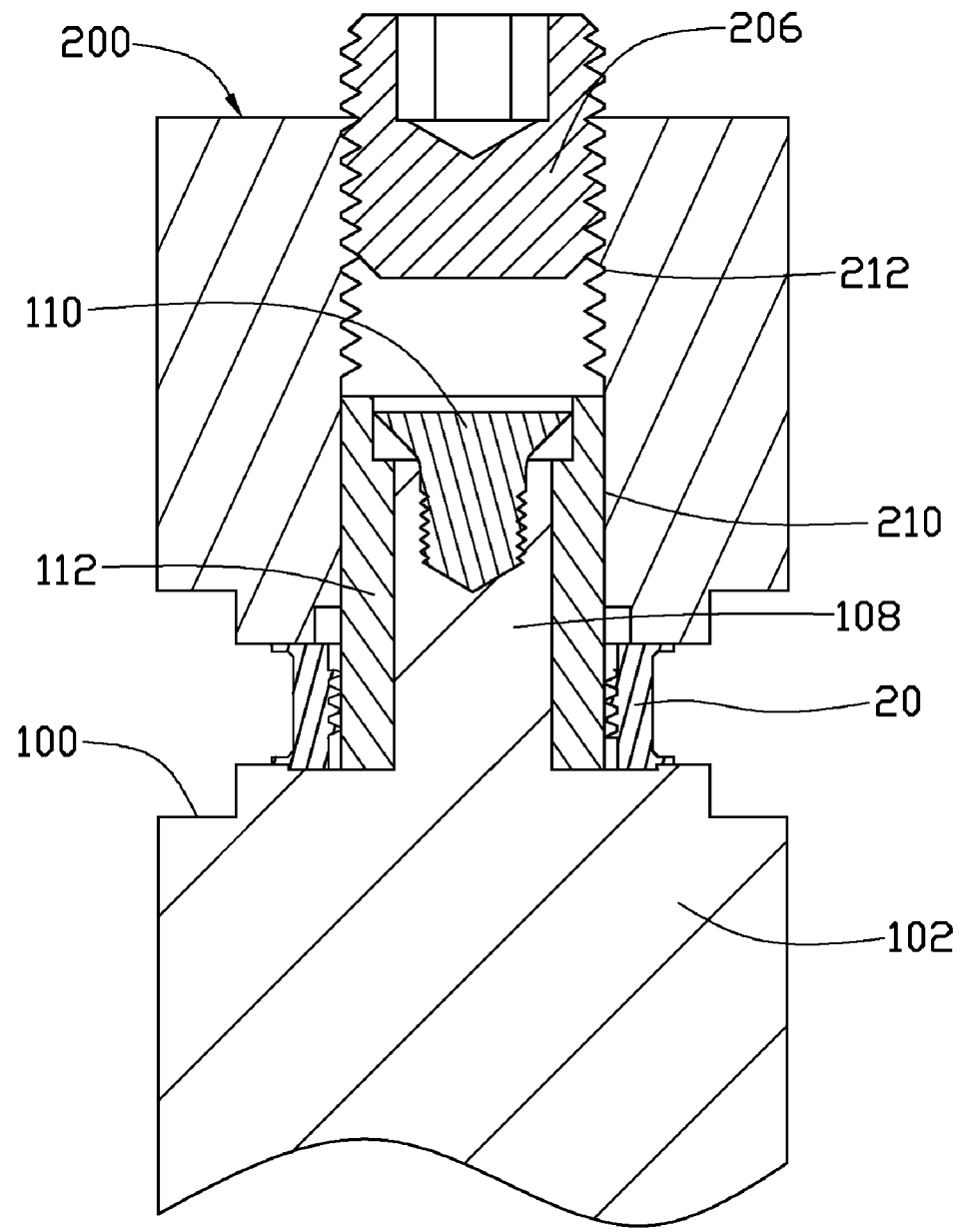
FIG. 2 is a partial, cross-sectional view, taken along the line IV-IV of FIG. 1.

Referring to FIG. 1 and FIG. 2, a coil rack fixing device 10 is configured to fix a coil rack 20 to a rotor 30 of a winding machine (not shown). The coil rack fixing device 10, according to an exemplary embodiment, includes a first member 100 and a second member 200.

Figure 3:
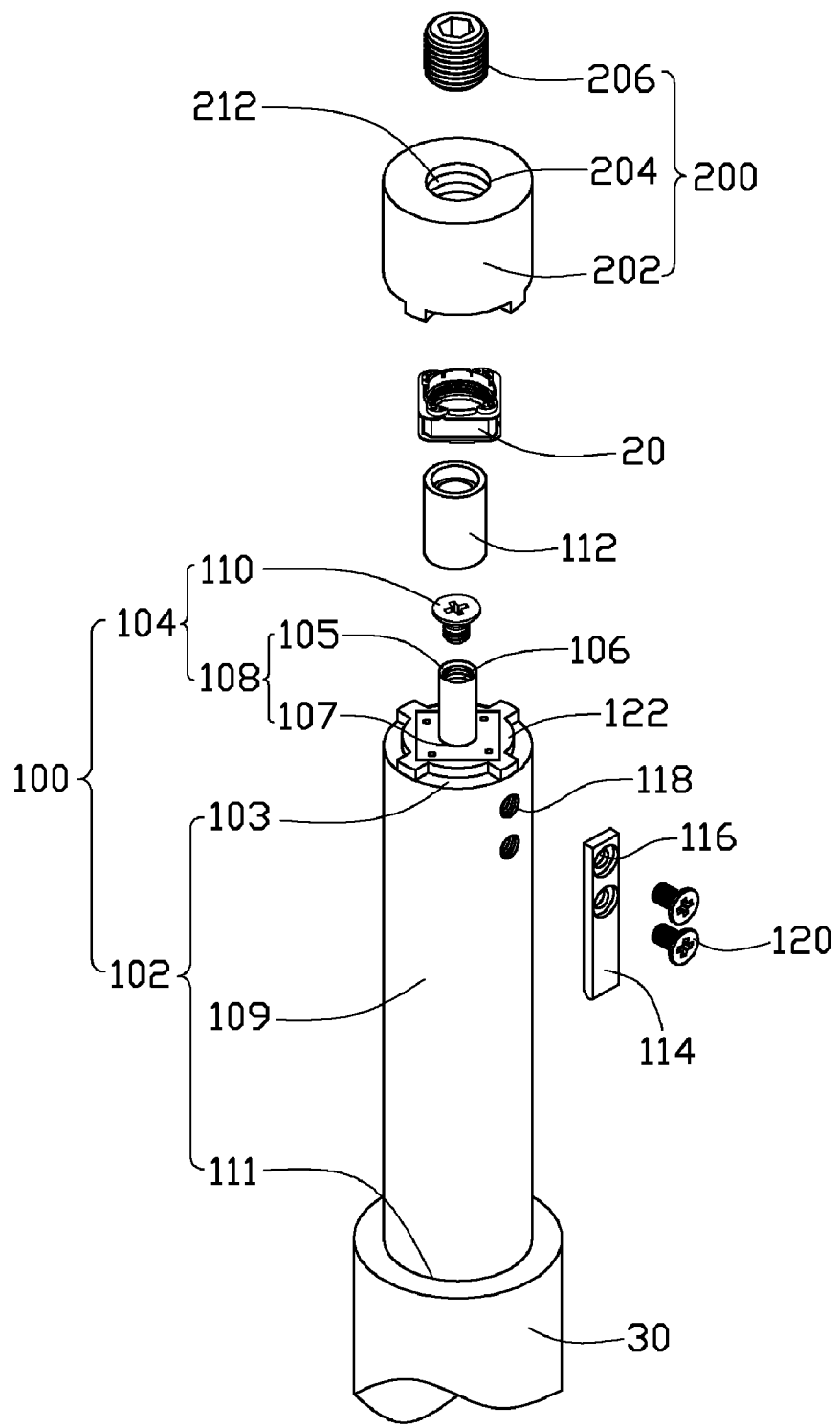
FIG. 3 is an isometric, exploded view of the coil rack fixing device of FIG. 1, showing the coil rack is fixed to the rotor by the coil rack fixing device.
Figure 4:
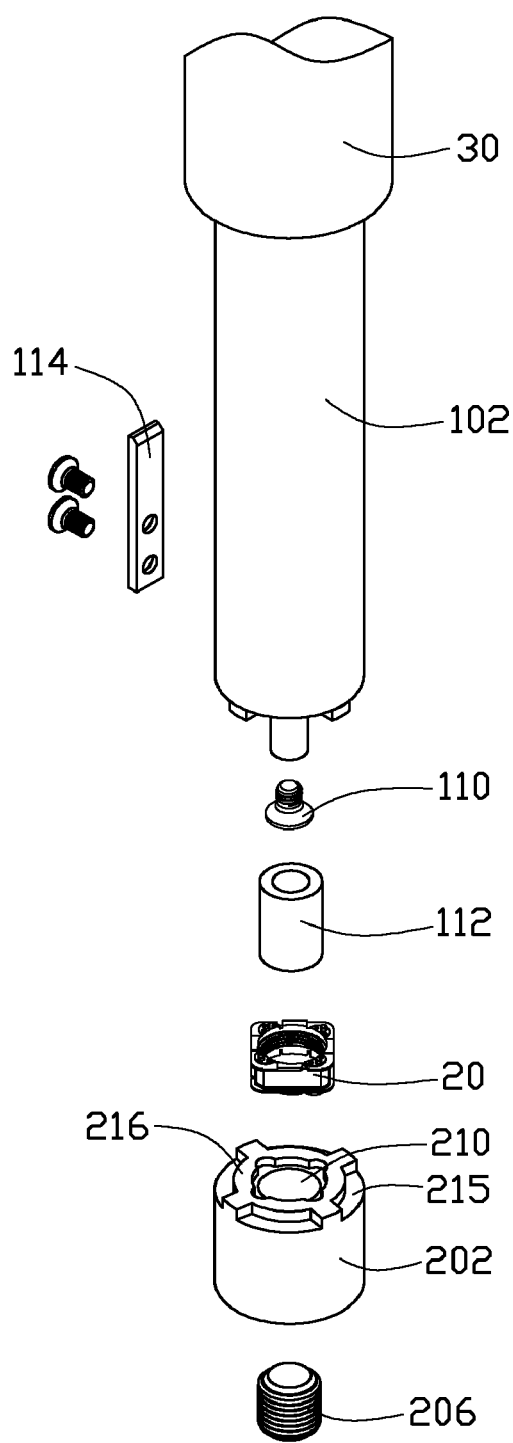
FIG. 4 is similar to FIG. 3, but viewed at another angle.

Also referring to FIG. 3 and FIG. 4, the first member 100 includes a substantially cylindrical first body 102 and a substantially cylindrical support shaft 104 coaxial with the first body 102. The first body 102 has a substantially circular upper surface 103, a substantially circular lower surface 111 opposite to the upper surface 103, and a cylindrical side surface 109 connecting the upper surface 103 and the lower surface 111. The first body 102 extends upward from the rotor 30 and the lower surface 111 contacts the center of the rotor 30.

The support shaft 104 includes a cylindrical shaft body 108 made of high magnet-resistive material (for example, plastic) and a magnetic attracting portion 110. The shaft body 108 has a top surface 105 and a bottom surface 107 opposite to the top surface 105. The shaft body 108 extends from the center of the upper surface 103 of the first body 102. The bottom surface 107 contacts the upper surface 103. The magnetic attracting portion 110 is positioned on the top surface 105. In the present embodiment, the magnetic attracting portion 110 is a magnetic screw. The top surface 105 defines a first screw hole 106 corresponding to the screw 110. The screw 110 is screwed into the screw hole 106.

The shaft body 108 is made of high magnet-resistive material for the sake of reducing weight, because compared to magnetic materials, high magnet-resistive materials are commonly lighter. In alternative embodiments, the shaft body 108 may also be made of magnetic material, such as steel. In this situation, the screw 110 and the screw hole 106 can be omitted, as the shaft body 108 is already qualified as having a magnetic attracting portion. Also, the way to form the magnetic attracting portion is not limited to the present embodiment, other technologies can be employed instead. For example, a magnetizer can be stuck to the top surface 105 of the shaft body 108.

The second member 200 includes a substantially cylindrical second body 202 made of highly magnet-resistive material (for example, plastic) and a magnet bolt 206. The second body 202 defines a substantially cylindrical through hole 204 running along the central axis thereof (not shown). The through hole 204 is divided into a first part 210 and a second part 212 at two opposite ends thereof. The first part 210 is shaped according to the support shaft 104 and used to receive the support shaft 104. The inner surface of the second part 212 has an inner screw thread. The magnet bolt 206 is a cylindrical headless bolt and has an outer screw thread. The magnet bolt 206 is screwed into the second part 212. The inner screw thread engages with the outer screw thread. As a result, the magnet bolt 206 can be moved along the longitudinal direction of the through hole 204 by the threaded engagement of the inner screw thread with the outer screw thread.

The magnet bolt 206 is shaped as a bolt for the sake of convenient position adjustment thereof in the threaded second part 212. However, the configuration of the magnet bolt 206 and the second part is not limited to the present embodiment. Similarly, the configuration of the shaft body 108 and the through hole 204 is not limited to the present embodiment, and can be redesigned depending on the configuration of the coil rack 20.

In operation, the support shaft 104 inserts into the coil rack 20 and the first part 210 of the second member 200 in sequence. In this way, the first member 100 and the second member 200 attracts each other by the magnetic force between the screw 110 and the magnet bolt 206, thereby the coil rack 20 is fixed between the first member 100 and the second member 200. One of the advantages of the fixing device 10 is that the magnetic force between the screw 110 and the magnet bolt 206 can be adjusted by adjusting the magnet bolt 206 within the threaded second part 212, which ensures that the magnetic force is lower than the maximum tolerance force of the coil rack 20.

The first member 100 further includes a plastic barrel 112 which sleeves the support shaft 104. The barrel 112 is configured for avoiding sharp scratches between the support shaft 104 and the coil rack 20.

The first member 100 further includes an elastic piece 114. The elastic piece 114 is made of flexible material, such as steel or plastic. The elastic piece 114 is rectangular and defines two second screw holes 116 on one end thereof. The side surface 109 defines two third screw holes 118 corresponding to the two second screw holes 116, closing to the upper surface 103. Two screws 120 are screwed into the second and the third screw holes 116, 118. As such, the elastic piece 114 is mounted on the side surface 109. The elastic piece 114 is configured for fixing the starting end of a winding (not shown) when starts winding the coil rack 20.

The first member 100 further includes a first fixing piece 122 formed on upper surface 103. The second member 200 has an end surface 215 facing the first member 100. The second member 200 further includes a second fixing piece 216 formed on the end surface 215. Both the first fixing piece 122 and the second fixing piece 216 are shaped according to two opposite surfaces (not labeled) of the coil rack 20. As such, when the coil rack 20 is intervened between the first member 100 and the second member 200, the two opposite surface contacts and engages with the first fixing piece 122 and the second fixing piece 216 respectively. Therefore, the coil rack 20 is firmly fixed on the fixing device 10 by the engagement of the first and the second fixing pieces 122, 216 and the two opposite surfaces of the coil rack 20.

It will be understood that the above particular embodiments is shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A coil rack fixing device for fixing a coil rack to a rotor of a winding machine, the coil rack fixing device comprising:
    a first member comprising a first body and a support shaft, wherein the first body has an upper surface, a lower surface for contacting the rotor, and a side surface connecting the upper surface and the lower surface, the support shaft extends upward from the center of the upper surface and has a magnetic attracting portion, the magnetic attracting portion is positioned on a free end of the support shaft; and
    a second member comprising a second body and a magnet, the second body defining a through hole, the through hole receiving the support shaft, wherein the magnet is capable of moving in the through hole relative to the magnetic attracting portion.

2. The coil rack fixing device of claim 1, wherein the first member further comprises an elastic piece, the elastic piece is mounted on the side surface and close to the upper surface.

3. The coil rack fixing device of claim 1, wherein the support shaft comprises a shaft body made of high magnet-resistive material, the shaft body has a top surface far away from the upper surface of the first body and a bottom surface opposite to the top surface, the bottom surface contacts the upper surface of the first body, the top surface defines a screw hole; the magnetic attracting portion is a magnetic screw, the screw screws into the screw hole.

4. The coil rack fixing device of claim 1, wherein the upper surface of the first body has a first fixing piece configured to engage with one side of the coil rack.

5. The coil rack fixing device of claim 4, wherein the second member has an end surface facing the first member, the end surface has a second fixing piece configured to engage with another side of the coil rack.

6. The coil rack fixing device of claim 1, wherein the second body is made of high magnet-resistive material, the through hole is defined along the axis of the second body, the through hole comprises a first part and a second part at two opposite ends thereof, the support shaft is received in the first part, the magnet is received in the second part.

7. The coil rack fixing device of claim 6, wherein the inner surface of the second part has an inner screw thread, the magnet is a cylindrical bolt and has an outer screw thread, the magnet screws into the second part, the inner and outer screw threads are engaged with each other.

8. The coil rack fixing device of claim 1, wherein the first member further comprises a plastic barrel, the plastic barrel sleeves the support shaft.

9. A coil rack fixing device for fixing a coil rack to a rotor of a winding machine, the coil rack fixing device comprising:
    a first body having an upper surface, a lower surface for contacting the rotor, and a side surface connecting the upper surface and the lower surface;
    a support shaft comprising a shaft body and a magnetic attracting portion, wherein the shaft body extends from the upper surface of the first body, the magnetic attracting portion is positioned on a free end of the shaft body;
    a second body defining a through hole, the through hole receiving the magnetic attracting portion and the shaft body; and
    a magnet capable of moving in the through hole relative to the magnetic attracting portion.

\* \* \* \* \*